UNITED STATES PATENT OFFICE.

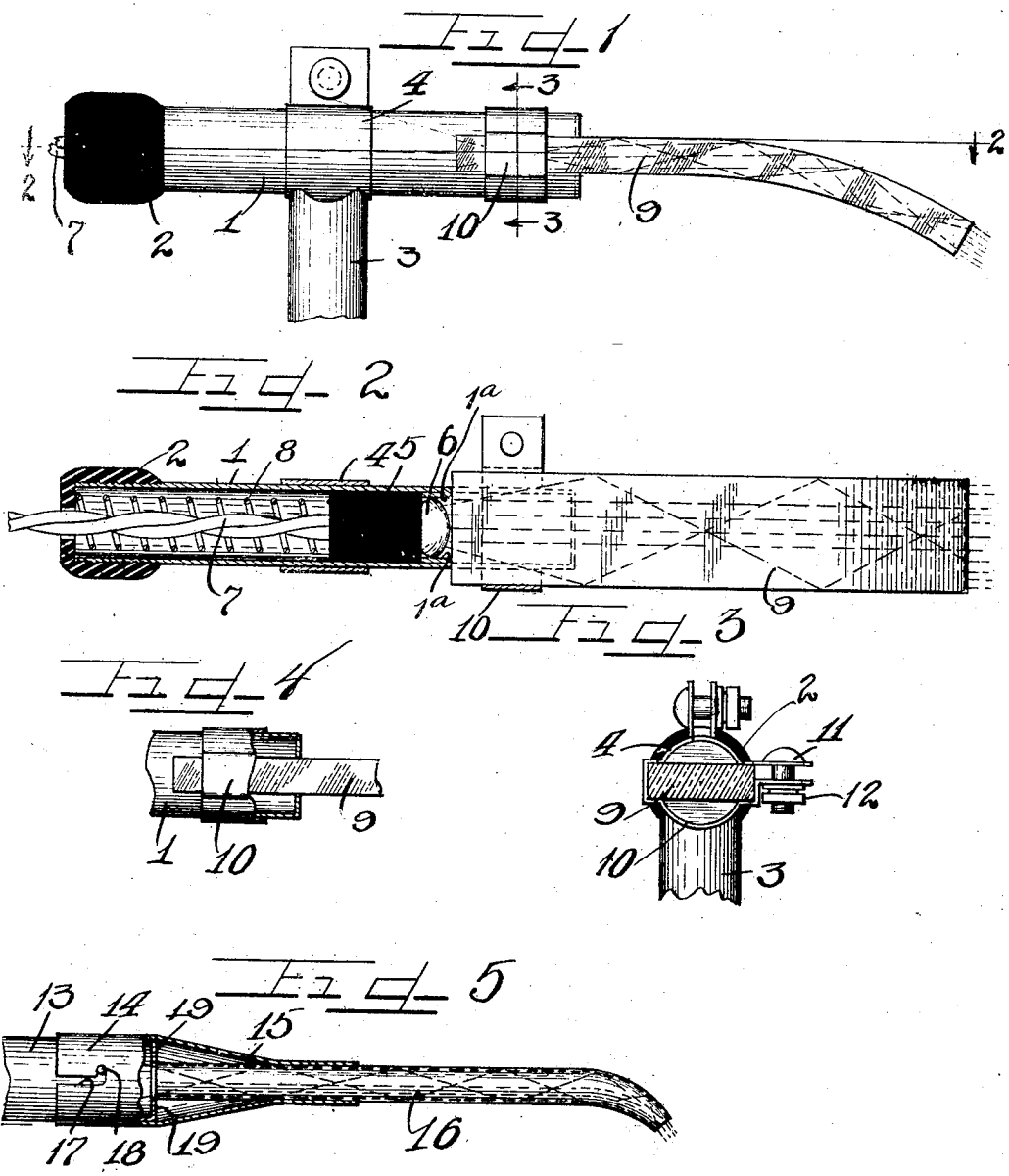

ISAAC J. SMIT, OF CHICAGO, ILLINOIS.

SELF-ILLUMINATING DEPRESSER FOR DENTAL AND SURGICAL WORK.

1,246,339.     Specification of Letters Patent.    Patented Nov. 13, 1917.

Application filed August 21, 1916. Serial No. 116,178.

*To all whom it may concern:*

Be it known that I, ISAAC J. SMIT, a citizen of the United States, and a resident of the city of Chicago, in the county of Cook and State of Illinois, have invented certain new and useful Improvements in Self-Illuminating Depressers for Dental and Surgical Work; and I do hereby declare that the following is a full, clear, and exact description of the same, reference being had to the accompanying drawings, and to the numerals of reference marked thereon, which form a part of this specification.

This invention relates to a self-illuminated device for dental and surgical use wherein the rays of light from a source forming a part of the instrument are constrained to pass through a long transparent conducting element for projection from the end thereof utilizing the phenomenon of internal reflection so that none of the rays of light are emitted through the side walls of the conducting element and clear observation may be had therethrough.

It is an object therefore of this invention to construct a self-illuminated instrument embodying a source of light having associated therewith a transparent light conducting medium adapted to transmit the light rays from the source by internal reflection for projection from the end of said element, and permitting clear vision to be had through the sides of the light transmitting element.

It is also an object of this invention to construct a device embodying a casing containing a source of light concealed therein, and with a transparent light conducting element releasably attached thereto adapted to conduct the rays of light from said source therethrough by the phenomenon of internal reflection so that an area may be illuminated by projection of the rays of light from the outer end of said light conducting elements.

It is furthermore an important object of this invention to construct a surgical or dental device consisting in part of a transparent light conducting medium through which the rays of light are conducted from a suitable source by the phenomenon of internal reflection and caused to traverse a path determined by the shape of the transparent conducting medium, being finally emitted at the bottom end thereof, and without being emitted through the side walls of said medium nor in any way affecting clear observation through said medium.

It is finally an object of this invention to construct a self-illuminating instrument wherein rays of light from a suitable source are conducted therethrough and emitted at the end thereof and yet permitting clear vision through said instrument due to the fact that the rays of light passing therethrough are entirely confined therein except for projection therefrom at a predetermined point or area on said instrument.

The invention (in a preferred form) is illustrated in the drawings and hereinafter more fully described.

On the drawings:

Figure 1 is a side elevation partly broken away of a device embodying the principles of my invention.

Fig. 2 is a section taken on line 2—2 of Fig. 1.

Fig. 3 is a detail section taken on line 3—3 of Fig. 1.

Fig. 4 is a fragmentary detail partly in section and partly in elevation showing the connection of the transparent light conducting element to the casing.

Fig. 5 is a fragmentary side elevation partly in section and partly in elevation of a modified form of device.

As shown in the drawings:

The reference numeral 1, indicates a cylindrical metal casing exteriorly threaded at one end, and having secured thereon an insulating closure 2, and secured substantially centrally upon said casing is a handle 3, held adjustably and releasably thereon by a clamp 4, forming a part of said handle structure. Inserted slidably within the casing 1, is an insulating plug 5, into which an electric bulb or lamp 6, is secured, and lead wires 7, are connected thereto through said plug 5, and lead outwardly through the casing 1, and an aperture provided in said insulating closure 2. A coiled spring 8, is provided within the casing 1, seated against the insulating closure 2, and bearing behind the insulating plug 5, to retain the same and the electric lamp 6, at the forward end of the casing against inturned portions 1ª, thereof, which afford a stop to limit the movement of the plug and its lamp. At its forward end said casing 1, is slotted longitudinally to permit insertion thereinto of the end of the glass or other transparent light conducting element or member 9, which is of rectangular cross-section, as shown in Fig. 3, and said light conducting element is held attached in the end of the casing by a clamp 10, provided with a screw 11, and tightening nut 12. The outer end of said light conducting element 9, is slightly curved, as clearly shown in Fig. 1, to facilitate the use thereof as a depressor or retractor for dental or surgical purposes. It will also be observed that the inturned portions 1ª are provided by turning back those portions of the casing 1 which are cut to form the slots receiving the member 9.

In the modified form of device illustrated in Fig. 5, I have shown a cylindrical casing 13, substantially the same in construction as the casing 1, of the prior construction, and containing an illuminating means therewithin (not shown). A detachable retaining member 14, having a conical extension 15, to receive a cylindrical glass conducting member 16, therein is provided to attach said glass element in proper position to receive the rays of light thereinto for transmission therethrough and projection at the outer end of said glass member. For this purpose, one or more bayonet slots such as that denoted by the reference numeral 17, shown in Fig. 5, are provided, adapted to coact with a projection or projections 18, on the casing 13, to thereby lock the glass retaining element in place although permittitng ready detachment thereof from the casing 13.

As shown, the forward end of the casing 13, is flanged inwardly as denoted by the reference numeral 19, thereby affording a central axial aperture through which the light passes for admission into the end of the transparent conducting element 16, said inwardly flanged portion also affording a stop for the inner end of said glass transmitting element 16, inserted into the retaining member 14—15. As shown, the outer end of the glass light conducting element 16, is slightly curved and tapered, affording a surface of small area through which the rays of light are projected in a condensed and intensified form.

The operation is as follows:

In the form of device illustrated in Figs. 1 to 4, inclusive, the glass light transmitting element 9, is of rectangular section, with the inner portion thereof substantially straight, and the outer portion curved, the extreme end surface at the curved portion being at right angles to the axis of curvature and to the side walls of said elements so that the majority of the light rays are projected normally therefrom. All of the light introduced into the transparent light conducting element 9, is confined therein due to the phenomenon of internal reflection for the reason that the angle of incidence of the rays striking the side walls or highly polished surfaces of said element or "surfaces of separation", is considerably greater than the critical angle of the glass and air media. Hence the light is not permitted to pass through said "surfaces of separation", but is reflected and cross-reflected within said element until it strikes the end surface at the outer curved end of said element and is there permitted to pass out owing to the incident angle being less than the critical angle for the glass and air media.

The straight parallel rays of light which are admitted into the transparent light conducting element 9, travel in parallel relation therethrough until they strike the point of curvature, and are then reflected as indicated by the dotted lines in Fig. 1, until, with the outer reflected rays within said element, they strike the end surface of said light conducting element, and pass therethrough.

In the form of device shown in Fig. 5, the light transmitting element 16, is of cylindrical or circular cross-section, and the outer curved end thereof is tapered so that the rays of light which progress therethrough and are confined therein due to the phenomenon of internal reflection, are condensed at the reduced tapered end portion thereof as they leave at the end surface of said light conducting element, and consequently the area illuminated, while not large, is brightly illuminated. In both cases, the respective transparent light conducting element permits ready vision therethrough, the rays of light in their passage therethrough being invisible through the side walls of said light conducting elements owing to the phenomenon of total internal reflection, which, due to the design of said light conducting element, is caused to take place.

It is obvious that many different types of light sources may be designed for use with the light conducting element and that said transparent light conducting element may take many different shapes, sizes and forms, and all may be interchangeably associated with a single source of light according to the purpose for which the instrument is to be used.

I am aware that various details of construction may be varied through a wide range without departing from the principles of this invention, and I therefore do not purpose limiting the patent granted otherwise than necessitated by the prior art.

I claim as my invention:

1. A device of the class described, comprising a casing slotted at one end and having said slotted portions turned back inwardly to form a stop, an insulating plug adapted to be inserted into said casing and limited in its movement therein by said inturned portions, an electric lamp carried by said plug, and a rectangular transparent light conducting element clamped detachably in the slots in said casing.

2. A device of the class described, comprising a casing slotted at one end and having said slotted portions turned back inwardly to form a stop, an insulating plug adapted to be inserted into said casing and limited in its movement therein by said inturned portions, an electric lamp carried by said plug, a closure for the unslotted end of said casing, a coiled spring in said casing disposed between said closure and said plug to retain the latter in position, and a rectangular transparent light conducting element clamped detachably in the slots in said casing.

In testimony whereof I have hereunto subscribed my name in the presence of two subscribing witnesses.

ISAAC J. SMIT.

Witnesses:
 CHARLES W. HILLS, Jr.,
 EARL M. HARDINE.

Copies of this patent may be obtained for five cents each, by addressing the "Commissioner of Patents, Washington, D. C."